Oct. 4, 1932.  W. H. KAISER  1,880,256

GAS METER

Filed April 1, 1929

William H. Kaiser
INVENTOR.

BY
ATTORNEYS.

Patented Oct. 4, 1932

1,880,256

UNITED STATES PATENT OFFICE

WILLIAM H. KAISER, OF ERIE, PENNSYLVANIA, ASSIGNOR TO AMERICAN METER COMPANY, OF NEW YORK, N. Y., A CORPORATION OF DELAWARE

GAS METER

Application filed April 1, 1929. Serial No. 351,528.

In the manufacture of gas meters it has been common to form the diaphragm enclosed metering chamber with enclosure plates and to solder the stationary plate to a wall of the meter and then cover, by solder, the opening in the movable plate through which the stationary plate is soldered. In order to solder the stationary plate and assure the closing of its port or conduit leading to it it is necessary to provide an opening at the movable side of the diaphragm practically coextensive with the diaphragm support. It is also necessary in the formation of these diaphragms to be able to finger the leather forming the diaphragm and properly dispose it along the seating base as it is bound in place. This gathering action gives to the diaphragm the proper flare adapting it for use. With the present invention the closing of the rear plate is obviated by using a separate rear plate and connecting port through it. The opening for the connecting port, or conduit need not be as large as was necessary for soldering the diaphragm ring to the back plate in the old practice and consequently the soldering action on the movable plate may be so remote from the diaphragm base as to prevent any heating which would tend to injure the diaphragm. Features and details of the invention will appear from the specification and claims.

A preferred embodiment of the invention is illustrated in the accompanying drawing as follows:—

Figure 1:
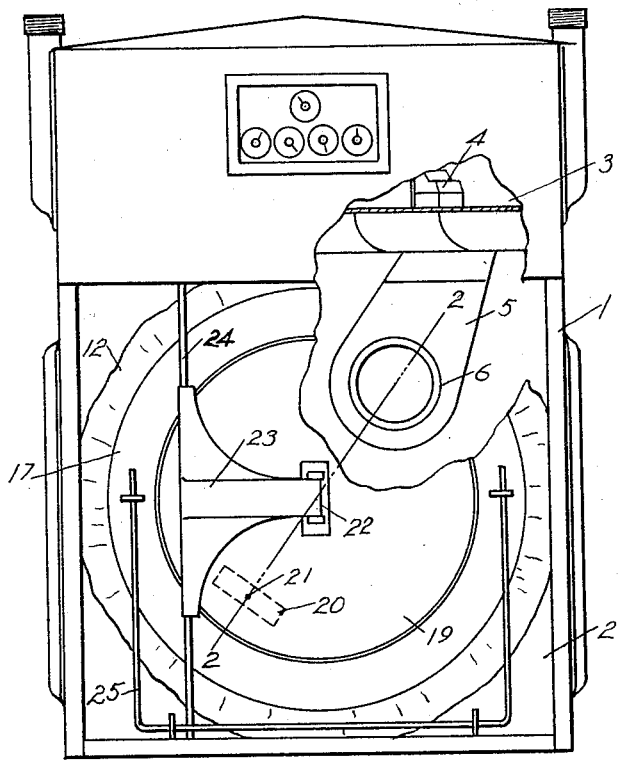

Fig. 1 shows the meter with the cover over the metering chamber removed.

Figure 2:
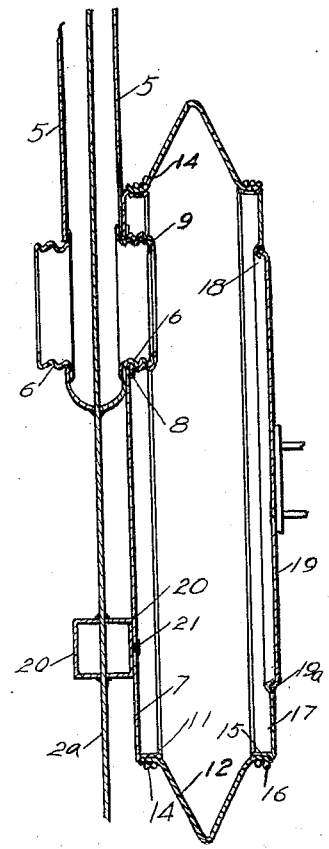

Fig. 2 a section on the line 2—2 in Fig. 1.

Figure 3:

Fig. 3 an enlarged sectional view of the clamping cap for securing the plate of the diaphragm.

Figure 4:
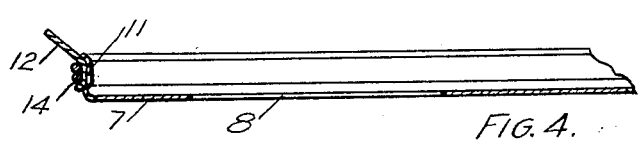

Fig. 4 an enlarged sectional view of the fixed plate of the diaphragm.

Figure 5:
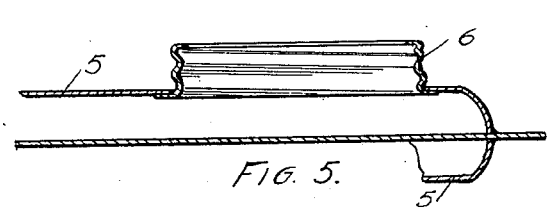

Fig. 5 an enlarged sectional view of the gas conduit and nipple leading to the metering chamber.

1 marks the the meter case. This is provided with a metering compartment 2, a valve compartment 3, the usual valve mechanism 4, a conduit 5 leading from the valve mechanism, and a nipple 6 leading outwardly from the conduit.

A metering chamber within the diaphragm has a fixed or back plate 7. This has an opening 8 preferably eccentrically arranged and this opening is placed over the nipple 6 against the face of the wall of the conduit and a clamping cap 9 is screwed on to the nipple clamping the plate against the face of the conduit. The plate 7 has a diaphragm seat ring 11 made in the form of a flange around the periphery of the plate. The diaphragm 12 has its inner edge seated on the ring 11 and bound thereon by a wrapping twine 14.

The outer edge of the diaphragm is secured on a seating ring 15 by means of a wrapping twine 16 and the seating ring 15 is formed on a movable plate 17, the seat being in the form of a flange on this plate. The plate 17 is provided with a central opening 18 which is sufficiently large to permit of the convenient completing of the connection between the conduit and the chamber by placing the cap 9 in place and is also sufficiently large to permit the operator to finger the edge of the diaphragm as it is formed on the seat ring 15. On the other hand it is sufficiently remote from the seat ring to permit of readily soldering a closure plate 19 to the plate 17 without injurious heat reaching the leather of the diaphragm. In order to facilitate the soldering the edge of the plate 17 has a small annular groove adjacent to its edge and the plate 19 has a slight flange entering this groove, the edge being soldered to the plate, the solder being applied at 19a. In order to support the stationary plate from the partition wall 2a of the case a base plate 20 is secured to the partition wall and extends outwardly to the same distance as the conduit 5 and the fixed plate 7 is soldered as at 21 to this base plate.

By placing the opening from the conduit through the back plate 7 in an eccentric position it is possible to adjust the diaphragm to space it with relation to the side walls of the case. The diaphragm as it collapses some times expands slightly more at one side than the other and this adjustment permits of so placing the diaphragm chamber as to care for this. The present invention speeds up the assembly very much in that the rather awkward soldering of the diaphragm ring at the rear to the partition plate and to the conduit 5 is avoided and also the danger from the heat accompanying this soldering which has heretofore been experienced with relation to this soldering is avoided.

What I claim as new is:—

1. In a gas meter, the combination of a case; a gas conduit leading into the case and having an opening in its side; a seat surrounding the opening; a nipple extending from the seat; a metering chamber comprising a fixed plate having an opening eccentrically placed with relation to the fixed plate and extending over the nipple, the eccentric location of the opening permitting the swinging of the fixed plate to adjust it relatively to the case; means clamping the fixed plate on the seat; a diaphragm secured on the periphery of the fixed plate; a movable plate; and means securing the diaphragm on the periphery of the movable plate.

2. In a gas meter, the combination of a case; a gas conduit leading into the case and having an opening in its side; a metering chamber comprising a fixed plate having an opening registering with the opening in the conduit side, said opening in the fixed plate being eccentrically placed with relation to the fixed plate, the eccentric location of the opening permitting the swinging of the fixed plate to adjust it in relation to the case; a diaphragm secured on the periphery of the fixed plate; a movable plate; means securing the diaphragm on the periphery of the movable plate; and means securing the fixed plate on the side of the conduit.

In testimony whereof I have hereunto set my hand.

WILLIAM H. KAISER.